(12) United States Patent
Tscheplak et al.

(10) Patent No.: US 6,276,504 B1
(45) Date of Patent: Aug. 21, 2001

(54) TWIN CLUTCH FOR MOTOR-VEHICLE GEARBOXES

(75) Inventors: Ernst Tscheplak, Weinstadt; Michael Salecker, Stuttgart; Gunter Worner, Kernen, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/528,805

(22) Filed: Mar. 20, 2000

(30) Foreign Application Priority Data

Apr. 24, 1999 (DE) .............................................. 199 18 733

(51) Int. Cl.[7] ...................................................... F16D 21/06
(52) U.S. Cl. .................... 192/48.8; 192/70.27; 192/89.22
(58) Field of Search .............................. 192/48.7, 70.27, 192/89.22, 91 R

(56) References Cited

U.S. PATENT DOCUMENTS

| 3,215,233 | * | 11/1965 | Smith et al. | 192/48.7 |
| 4,210,232 | * | 7/1980 | Beccaris | 192/48.8 |
| 4,214,653 | * | 7/1980 | Slack | 192/48.7 |
| 4,440,281 | * | 4/1984 | Hauguth | 192/48.8 |
| 5,678,669 | * | 10/1997 | Rainer | 192/48.8 |

FOREIGN PATENT DOCUMENTS

2044865 * 10/1980 (GB) ................................. 192/48.8

* cited by examiner

Primary Examiner—Richard M. Lorence
(74) Attorney, Agent, or Firm—Mark P. Calcaterra

(57) ABSTRACT

A twin clutch has two clutch discs, each arranged on one of two coaxial shafts, having a clutch cage, which surrounds the clutch discs in the manner of an annulus, and having pressure plates which are held in a rotationally fixed manner therein and are arranged axially in such a way that they can be displaced separately axially between the clutch discs and can be pressed against the clutch discs by a diaphragm-spring arrangement arranged axially between them and can be disengaged from the respective clutch disc by means of separate release members. The diaphragm-spring arrangement includes at least two diaphragm springs of essentially the same type arranged in series, giving a broad actuating range with a constant spring force. When the release members are unactuated, the diaphragm-spring arrangement operates in this actuating range irrespective of clutch wear, it being possible to transmit approximately half of a maximum torque to be transmitted at each clutch.

3 Claims, 2 Drawing Sheets

FIG 2
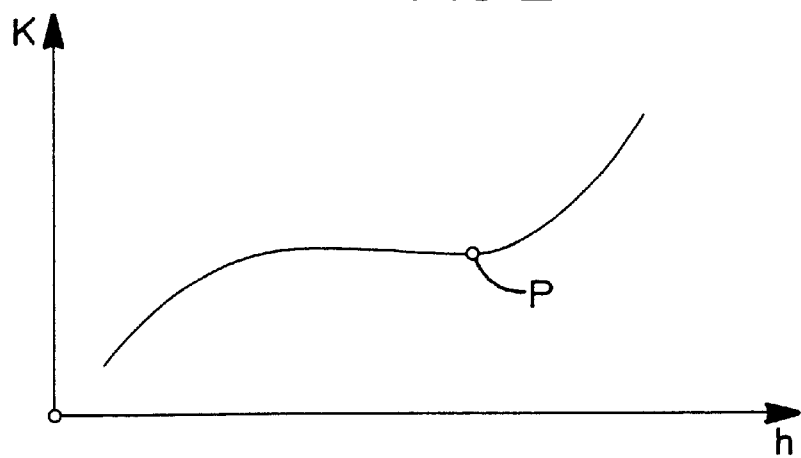
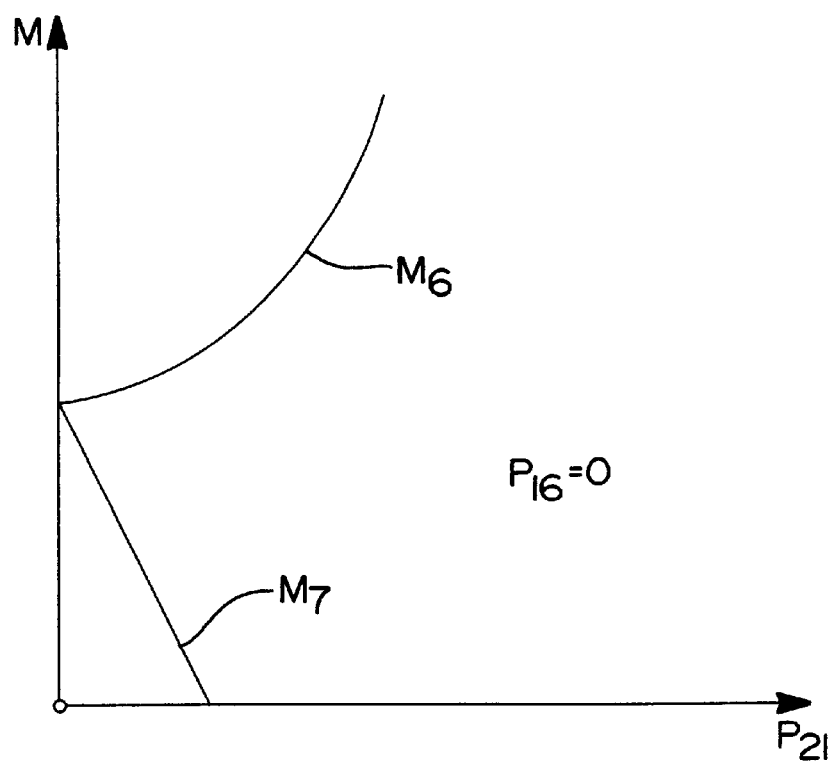
FIG 3

TWIN CLUTCH FOR MOTOR-VEHICLE GEARBOXES

BACKGROUND OF THE INVENTION

Field of the Invention

The invention relates to a twin clutch for motor-vehicle gearboxes having two clutch discs, each arranged on one of two coaxial shafts. A clutch cage surrounds the clutch discs in the manner of an annulus. Pressure plates are held in a rotationally fixed manner and are arranged axially in such a way that they can be displaced separately axially between the clutch discs. The pressure plates can be pressed against the clutch discs by a diaphragm-spring arrangement arranged axially between them and can be disengaged from the respective clutch disc by separate release members.

DESCRIPTION OF PRIOR DEVELOPMENT

Twin clutches are required in motor vehicles for two-path gearboxes which can be operated without interruption of the tractive effort. Gearboxes of this kind have two inputs which are coupled continuously in terms of drive via selectable transmission stages, which are generally different, to a common gearbox output which, for its part, is connected to the driven wheels of the vehicle. The twin clutch assigned to these two-path gearboxes has an input which is connected in terms of drive to the vehicle engine and, in the case of the twin clutch stated at the outset, is formed by the clutch cage. This clutch input can be coupled via two separately controllable clutches which, in the case of the abovementioned twin clutch, are formed by the clutch discs and the associated pressure plates, to the two gearbox inputs which are connected in terms of drive to mutually coaxial shafts.

In normal driving operation, one clutch is closed while the other clutch is open, with the engine and the driven wheels thus being connected to one another in terms of drive via one clutch and the gearbox path associated with this clutch. Within the other path of the gearbox, it is now possible to select, in principle, any drive ratio and this then takes effect when the other clutch is closed and the first clutch is opened.

It is advantageous that, by virtue of the diaphragm-spring arrangement arranged between the pressure plates, the closing force of one clutch is automatically increased when the other clutch is opened if the release members of the first clutch remain unactuated.

There is furthermore the possibility of configuring the spring characteristic of the diaphragm-spring arrangement in such a way that, although both clutches are simultaneously closed when the release members of both clutches remain unactuated, the clutch torques of both clutches which are brought about with this mode of operation are each significantly below the maximum torque of the vehicle engine. This prevents locking up of the drive line if both clutches fail to close properly.

SUMMARY OF THE INVENTION

It is then the object of the invention to optimize the design of a twin clutch of the type stated above.

According to the invention, this object is achieved by virtue of the fact that the diaphragm-spring arrangement includes at least two diaphragm springs of essentially the same type arranged in series which, when the release members are unactuated and the clutches are free from wear, are preloaded to within the vicinity of an upper limit of their range of constant force and, within this range, have a pressure force at which approximately half of a maximum clutch torque to be transmitted can be transmitted at each clutch disc when the release members are unactuated.

The invention is based on the general idea of exploiting the fact that, in a range of medium spring travels, diaphragm springs have an essentially constant spring force. Arranging at least two diaphragm springs in series makes it possible to ensure a comparatively large spring travel with a constant spring force and to use it irrespective of clutch wear. It is possible at the same time to ensure the desirable protection of the drive line from locking up if the clutch torques brought about in the range of constant force of the diaphragm springs are each no more than half of the maximum torque to be transmitted, i.e. the maximum engine torque.

According to a preferred embodiment of the invention, the two diaphragm springs are arranged approximately symmetrically with respect to a radial plane of the coaxial shafts. In this arrangement, the abutments of the diaphragm-spring arrangement which are on the pressure-plate side can likewise be designed so as to be symmetrical with respect to one another, and an intermediate bearing between the two diaphragm springs can be dispensed with.

BRIEF DESCRIPTION OF THE DRAWINGS

FIG. 2 shows a plot of a typical spring characteristic of a diaphragm spring and FIG. 3 shows a diagram which represents the clutch torques as a function of the actuating force of the release members of one of the clutches.

DETAILED DESCRIPTION OF THE PREFERRED EMBODIMENT

Figure 1:
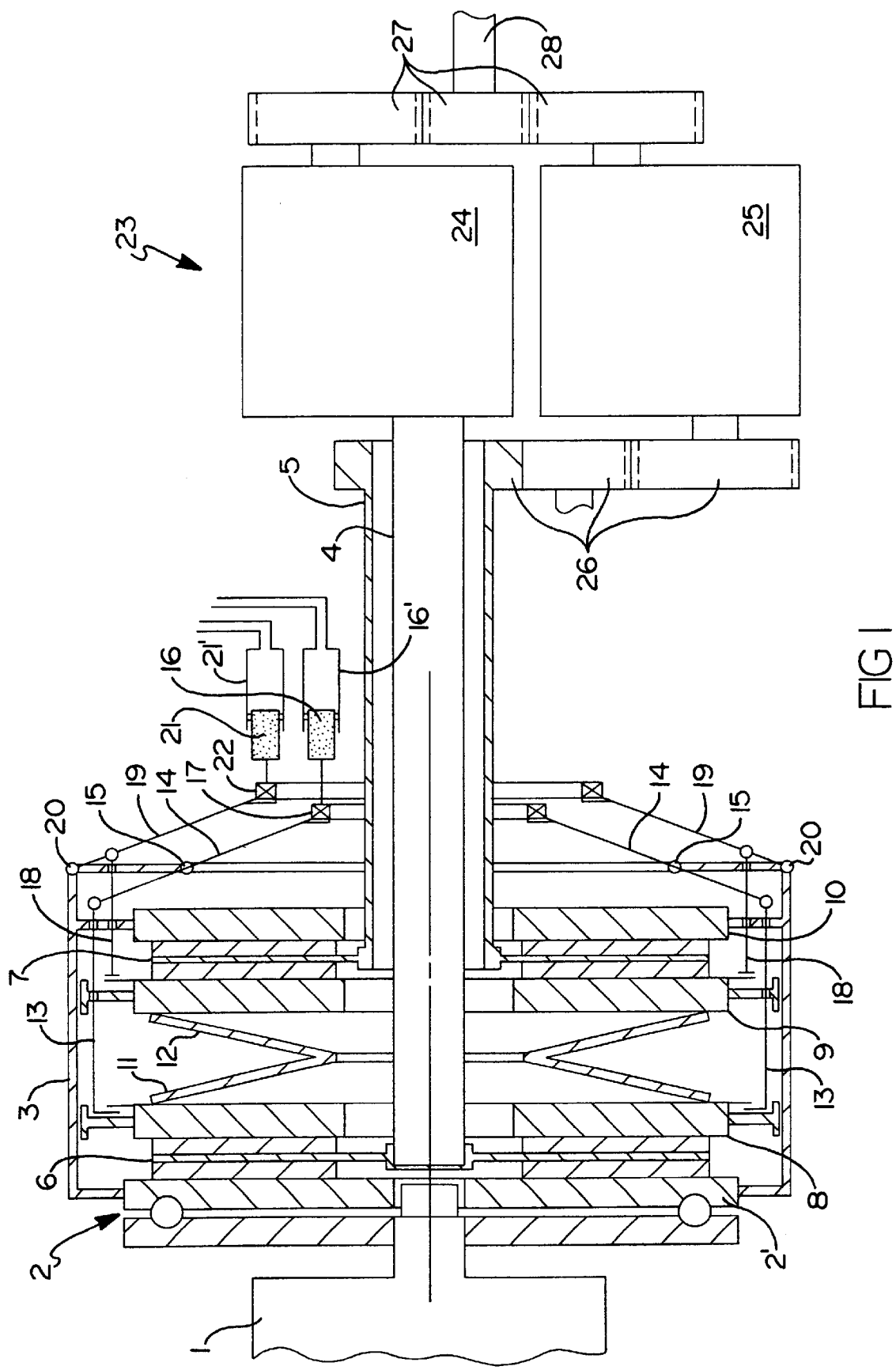
FIG. 1 shows a schematic representation of a twin clutch with two-path gearboxes connected to an output.

In the example in FIG. 1, a dual-mass flywheel 2, the secondary-mass wheel 2' of which is connected in a rotationally fixed manner to a clutch cage 3 similar to an annulus, is arranged on the output shaft of a motor-vehicle engine 1.

Arranged concentrically relative to the cage, within the clutch cage 3, are two coaxial shafts 4 and 5, which are connected in a rotationally fixed manner to respective clutch discs 6 and 7.

The first clutch disc 6 that is connected to shaft 4 can be pressed axially against the secondary-mass wheel 2' of the flywheel 2. The secondary-mass wheel 2' serves as a counterpressure plate with respect to a first pressure plate 8. Pressure plate 8 is arranged in an axially displaceable manner on the clutch cage 3 in order to establish a corresponding force-maintained engagement between the clutch cage 3 and the shaft 4 and hence between the motor-vehicle engine 1 and the shaft 4.

The second clutch disc 7 that is connected to shaft 5 can be pressed axially by a pressure plate 9 against a counterpressure plate 10 arranged in a fixed manner on the clutch cage 3. Pressure plate 9 is axially displaceable on the clutch cage 3, thus coupling the clutch cage 3 and motor-vehicle engine 1 and the shaft 5 in force-maintained engagement.

The two pressure plates 8 and 9, which are arranged axially between the clutch discs 6 and 7, are acted upon by a diaphragm-spring arrangement, which is arranged axially between them. The diaphragm-spring arrangement includes diaphragm springs 11 and 12 which tend to push the pressure plates 8 and 9 against the flywheel 2 and the counterpressure plate 10, respectively.

The pressure plates 8 and 9 can be raised and released from the associated clutch discs 6 and 7 against the force of the diaphragm springs 11 and 12.

Pressure plate 8 is raised and released from disc 6 by pull rods 13 which are actuated by actuating levers 14 that can pivot in bearings 15 on the clutch cage 3. Actuation is performed by actuating pistons 16 which are coupled to the adjacent ends of the actuating levers 14 by a release bearing 17. The pistons 16 can be displaced to the left in FIG. 1 by the introduction of pressure medium into associated cylinders 16'.

To release pressure plate 9 from clutch disc 7, push rods 18 are provided, these being actuated by actuating levers 19 which can be pivoted in bearings 20 on the clutch cage 3. Actuation is performed by actuating pistons 21, which are coupled to the adjacent ends of the actuating levers 19 by a further release bearing 22. Pistons 21 can be displaced to the left in FIG. 1 by introducing pressure medium into cylinders 21'.

The shafts 4 and 5 form two inputs of a two-path gearbox 23 or are connected in terms of drive to corresponding gearbox inputs.

This two-path gearbox 23 has two component transmissions 24 and 25. In the example illustrated shaft 4 is connected directly to the input of component transmission 24 and shaft 5 is connected by way of gearwheels 26 or the like to the input of component transmission 25.

The two component transmissions 24 and 25 can be operated separately from one another, with different gear ratios generally being selected in component transmissions 24 and 25.

The outputs of component transmissions 24 and 25 are connected in a positive manner by gearwheels 27 or the like to an output shaft 28 of two-path gearbox 23. The output shaft is connected in terms of drive to the driven vehicle wheels in the case of a motor vehicle.

In normal operating conditions, either the pistons 16 or the pistons 21 are subjected to hydraulic pressure in such a way that either pressure plate 8 is disengaged from clutch disc 6 or pressure plate 9 is disengaged from clutch disc 7, with power transmission from the vehicle engine 1 to the output shaft 28 of the two-path gearbox 23 thus taking place either via shaft 4 and component transmission 24 or shaft 5 and component transmission 25.

If neither the pistons 16 nor the pistons 21 are subjected to hydraulic pressure, both clutch discs 6 and 7 are subjected to pressure by the associated pressure plates 8 and 9, with the result that the motor-vehicle engine 1 is coupled to both shafts 4 and 5 by force-maintained engagement. Despite the fact that the transmission ratios of component transmissions 24 and 25 are generally different, it is not possible for lock-up to occur because the spring force of the diaphragm springs 11 and 12 is dimensioned so that, in terms of magnitude, only about half the maximum engine torque can be transmitted via each clutch disc 6 and 7 when neither the pistons 16 nor the pistons 21 are being subjected to pressure.

The spring characteristic curve of the diaphragm springs 11 and 12 is illustrated by FIG. 2. If the two diaphragm springs are compressed axially, the spring force K initially rises degressively as the spring travel h increases. As the spring travel h increases further, a range of approximately constant spring force K is passed through, this range being comparatively large due to the provision of two diaphragm springs 11 and 12. As the spring travel h increases further still, the spring force K then rises progressively.

In the twin clutch in FIG. 1, the diaphragm springs 11 and 12 are in a state corresponding to point P in FIG. 2 when the pistons 16 and 21 are unpressurized and the clutch discs 6 and 7 are free from wear, i.e. the diaphragm springs 11 and 12 are compressed to within the vicinity of the upper limit of their range of constant force.

Increasing wear of the clutch discs 6 and 7 means that, when the pistons 16 and 21 are unpressurized, a state is established in which the point P is displaced increasingly to the left in FIG. 2.

By virtue of the twin arrangement of the diaphragm springs 11 and 12, a very wide range of constant spring force is achieved, with the result that this range cannot be departed from in the case of unpressurized pistons 16 and 21, even with increasing wear of the clutch discs 6 and 7.

FIG. 3 shows in schematic form how the torques M transmitted by the clutch discs 6 and 7 change when the pistons 21 are subjected to increasing hydraulic pressure $P_{21}$ while the pistons 16 remain unpressurized, i.e. the pressure $P_{16}$ acting on these pistons 16 is zero.

As the pressure $P_{21}$ increases, the torque $M_7$ that can be transmitted by clutch disc 7 decreases in an approximately proportional manner down to zero, while the torque $M_6$ that can be transmitted by clutch disc 6 increases progressively. As regards the torques that can be transmitted by the clutch discs 6 and 7, the conditions are reversed if the pressure $P_{21}$ is zero and the pressure $P_{16}$ rises.

What is claimed is:

1. A twin clutch assembly, comprising:

first and second coxial shafts;

first and second clutch discs respectively carried on said first and second shafts;

an annular clutch cage surrounding said clutch discs;

first and second pressure plates rotationally fixed to said clutch cage and respectively axially movable between and against said clutch discs;

first and second release members respectively engagable with said first and second pressure plates;

first and second diaphragm springs arranged axially in series between said clutch discs and respectively pressing said pressure plates toward said clutch discs such that when said release members are unactivated and said clutch discs are free from wear, said springs are preloaded to a value near an upper limit of their range of constant force and, within said range, exert a pressure at which about half of a maximum clutch torque can be transmitted at each clutch disc when the release members are unactivated.

2. The twin clutch assembly of claim 1, wherein said first and second diaphragm springs are arranged substantially symmetrically with respect to a radial plane extending through said coxial shafts.

3. The twin clutch assembly of claim 1, wherein said first and second diaphragm springs are respectively retained exclusively on said first and second pressure plates.

* * * * *